April 23, 1968 B. H. HUMPHERYS 3,379,981
PULSE WIDTH DISCRIMINATOR
Filed Feb. 4, 1965
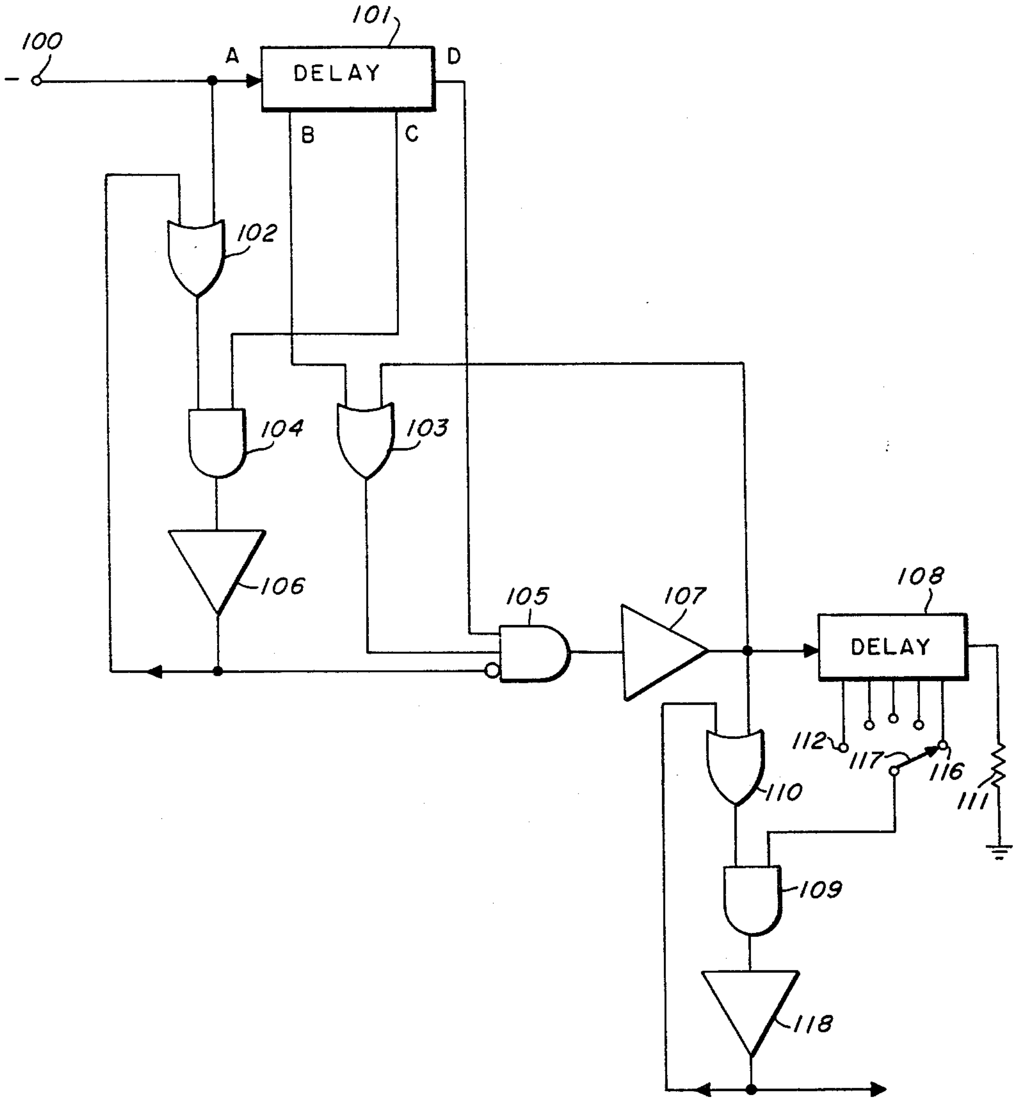
INVENTOR.
BERNARR H. HUMPHERYS
BY
ATTORNEYS

United States Patent Office 3,379,981

Patented Apr. 23, 1968

3,379,981

PULSE WIDTH DISCRIMINATOR

Bernarr H. Humpherys, Escondido, Calif., assignor to the United States of America as represented by the Secretary of the Navy Filed Feb. 4, 1965, Ser. No. 430,505

5 Claims. (Cl. 328—112)

ABSTRACT OF THE DISCLOSURE

A pulse width discriminating device for examining the duration of pulse signals and passing them only when of a certain predetermined width. By using a regenerative loop, the device produces output pulses which are accurate representations of those at its input. Two stages of discrimination are used to prevent pairs of properly spaced pulse spikes from appearing as a pulse of the same duration as the spike spacing. Each stage includes a delay line and associated coincidence detecting circuitry.

The invention described herein may be manufactured and used by or for the Government of the United States of America for governmental purposes without the payment of any royalties thereon or therefor.

The present invention relates to electrical circuits and particularly, to an electrical circuit for sensing pulse widths and specifically, to a pulse width discriminator.

The prior art pulse width discriminators, in general, utilize delay line techniques. These techniques may vary from application to application but the various techniques have certain disadvantages in common. They do not restore the pulse to the original width and in addition, cannot discriminate against spikes that fall in at a proper spacing on the delay line. Thus, it would be desirable if a pulse width discriminator were provided which is adjustable for various pulse widths and in addition, restores the original pulse width so that the pulse width has sharp leading and trailing edges and further, is able to discriminate against spikes, perhaps noise spikes, that fall in at the proper spacing and give the illusion of a pulse of the correct width.

An object of the present invention is to provide a practical pulse width discriminator which is extremely simple and low-cost to construct.

A further object of the present invention is to provide a pulse width discriminator which restores an input pulse to its original width.

Another object of the present invention is to provide a pulse width discriminator which restores the pulse to its original width and sharpness and discriminates against spikes that fall in when spaced apart at the length of the desired pulse.

Other objects and many of the attendant advantages of this invention will be readily appreciated as the same becomes better understood by reference to the following detailed description when considered in connection with the accompanying drawing wherein:

In the figure, an input is coupled from input 100 to a storage device 101. In the present invention the storage device 101 comprises a delay line however, it is to be understood that any appropriate storage means might be utilized. The delay line 101 is shown as having taps A, B, C and D however, in actual operation the output taps would comprise multiple output taps in cooperation with a switching means so that the pulse lengths might be varied.

Tap A is coupled as one input to an OR gate 102; tap B as one input to an OR gate 103; tap C as one input to an AND gate 104 and tap D as one input to an AND gate 105.

Another input to OR gate 102 comprises the output of an amplifier 106 which derives its input in turn, from AND gate 104. The output of amplifier 106 is also coupled as an inhibit input to AND gate 105. The output of OR gate 102 is coupled as another input to AND gate 104.

The output from AND gate 105 is coupled through an amplifier 107 back to the input of OR gate 103, the output of which is coupled as another input to AND gate 105.

The output of amplifier 107 is also coupled as the input to another storage means 108 which is also, in the present instance, a delay line. The delay line is terminated through its characteristic impedance 111 to ground and also has multiple output taps such as 112 through 116. The multiple output taps are connected as an input to an AND gate 109 through a movable switch contact 117. The other input to AND gate 109 is the output of an OR gate 110 which receives one input from the amplifier 107 and another input from the output of an amplifier 118 which is driven by the output of AND gate 109. The output of amplifier 118 comprises a pulse of the correct width.

*Operation*

The spacing between taps B and D on delay line 101 in the example, comprise the correct spacing i.e. this is the desired pulse length that is to be attained at the output of AND gate 109. Pulses that are shorter than the BD spacing will not be decoded in AND gate 105 and will not appear at all. Therefore, at this point the device is able to discriminate against pulses which are shorter than the desired pulse width.

Pulses of the correct length will be decoded in AND gate 105 which will provide an output from 105 which drives amplifier 107. An output from 107 is coupled back through OR gate 103 to the input of AND gate 105 which will sustain the output from AND gate 105. In effect, there is a regenerative link from the output of AND gate 105 back to the input of AND gate 105 through OR gate 103 and amplifier 107. Through this means, an output from amplifier 107 will be maintained until the trailing edge of the pulse clears tap D. Otherwise, there would be a narrower pulse output from AND gate 105 than the original pulse due to the action of AND gate 105 which is only "on" when a pair of pulses appear simultaneously at the input.

The output of amplifier 107 is also coupled to the delay line 108 having multiple output taps 112–116. The spacing between the input of delay line 108 and one of the output taps is set for the correct length, i.e. the pulse length BD in delay line 101, and the pulse will be decoded in the AND gate 109. Therefore, nothing is done to a pulse of the correct length in this portion of the circuit. Again, the output of AND gate 109 is coupled back to the input through the OR gate 110 as a regenerative loop to sustain the pulse until the trailing edge clears the correct output tap from delay line 108.

If a pulse enters line 101 that is too long, say 2.5 microseconds instead of a desired 2 microsecond pulse, an output will appear at taps A and C and be decoded in AND gate 104. Thus, the criteria is that the spacing between taps A and C be slightly longer than the spacing between taps B and D so that over long pulses will be decoded on taps A and C. The output of taps A and C is coupled as a pair of inputs to AND gate 104 and decoded in the gate which will provide an output from amplifier 106. The output of amplifier 106 is coupled back through the OR gate 102 to the input of the AND gate 104 to sustain the output from the gate until the trailing edge of the pulse that is too long clears output tap C. Tap C is very close to D and theoretically could be tap D except that a slight "pre-knock" is desired to allow the circuits involved to settle.

The output of amplifier 106 is also coupled as an inhibit pulse to the input of AND gate 105 so that no output will result from AND gate 105 when the over-long pulse hits taps B and D. Therefore, at this point the device discriminates against over-long pulses in that no output occurs from amplifier 107.

In some instances there might be two spikes spaced apart by the length BD so that would appear to be a pulse with the correct spacing in delay line 101. In such a case, due to the non-continuity of the pulses, there will only be a narrow output from amplifier 107. This is due to the fact even though the pulses are decoded initially in AND gate 105 the regenerative output from 107 by itself is not enough to sustain or render the AND gate 105 operative in that as soon as the one spike clears output tap D AND gate 105 will turn "off" and terminate the pulse output from amplifier 107.

The narrow output from amplifier 107 is then coupled to delay line 108 which is set for a pulse of the correct length and in that the pulse from 107 is too short the pulse will not fall in at the correct spacing on the delay line 108 and will not be decoded in AND gate 109. Therefore, no output results from AND gate 109 to drive amplifier 118. Thusly, at this point, the circuit is able to discriminate against noise spikes which fall in at the correct pulse spacing in delay line 101.

Therefore, through the use of the present circuit one is able to attain a low cost practical pulse discriminator which discriminates in favor of pulses of desired length as against pulses which are too short, too long or a pair of spikes which appear to fall in at the correct pulse width.

Obviously many modifications and variations of the present invention are possible in the light of the above teachings. It is therefore to be understood that within the scope of the appended claims the invention may be practiced otherwise than as specifically described.

What is claimed is:

1. A pulse width discriminating means comprising;
   input means adapted to receive an input waveform having a finite duration and having a recognizable leading and trailing edge;
   storage means comprising a delay line having an input and multiple output taps;
   said storage means being adapted to receive the input waveform;
   coincidence means operatively coupled to a selected pair of output taps on said storage means;
   said coincidence means being operative to produce an output pulse when the leading and trailing edge of a pulse of a finite duration are present at the input to said coincidence means simultaneously;
   a regenerative link coupled from the output of said coincidence means back to the input of said coincidence means to maintain a pulse output while the trailing edge of the desired pulse in the delay line moves from the first to the second of the said selected pair of output taps;
   another coincidence means;
   another selected pair of outputs on said storage means being connected as inputs to said another coincidence means;

said another coincidence means being operative to produce an output pulse when an output is present at said other pair of output taps;
   said other pair of output taps being spaced apart by a length longer than the spacing of said first mentioned output taps so that a pulse longer than a desired pulse width is recognized in said another coincidence means;
   the output of said other coincidence means being coupled as an inhibit input to said first mentioned coincidence means when a pulse longer than the desired length is present in the storage means.

2. A pulse width discriminator as set forth in claim 1 and further including:
   a regenerative link coupled between the output of said another coincidence means and the input of said another coincidence means to maintain said another coincidence means on until a longer pulse moves from the first to the second of the second mentioned pair of output taps so that an inhibit pulse is present at the input to said first mentioned coincidence means while a pulse having a length greater than a desired length is present in the delay line.

3. A pulse width discriminator as set forth in claim 2 and further including;
   means to discriminate against noise spikes having a spacing the same as the spacing of a desired pulse width;
   said means comprising another storage means operatively coupled to the output of said first mentioned coincidence means;
   said storage means having multiple output taps any pair of which is adapted to be set to the predetermined desired pulse width spacing; and
   further coincidence means being coupled to a desired pair of output taps on said another storage means;
   said coincidence means being operative to produce an output when a pulse of the desired width is continuously present in said another storage means.

4. A pulse width discriminator as set forth in claim 3 wherein;
   said another storage means comprises another delay line having multiple output taps; and
   said further coincidence means comprises an AND gate having a pair of inputs and an output;
   said AND gate functioning such that when inputs are present simultaneously at the input an output results.

5. A pulse width discriminator as set forth in claim 4 and further including;
   a regenerative link coupled from the output of said last mentioned AND gate back to the input so that as a pulse travels down the last mentioned delay line an output is present at the output of the AND gate until the desired pulse is terminated at the appropriate output tap in said another delay line.

References Cited

UNITED STATES PATENTS

| | | | |
|---|---|---|---|
| 2,841,710 | 7/1958 | Marshall | 328—112 |
| 2,951,988 | 9/1960 | Harlan | 328—112 |
| 3,333,187 | 7/1967 | Whitfield | 328—112 |

ARTHUR GAUSS, *Primary Examiner.*

H. DIXON, *Assistant Examiner.*